United States Patent [19]

Cornforth

[11] 4,056,717
[45] Nov. 1, 1977

[54] TEMPERATURE CORRECTION SYSTEMS FOR A FLUID FLOW METER

[75] Inventor: Malcolm W. Cornforth, Edgewater Park, N.J.

[73] Assignee: The Singer Company, New York, N.Y.

[21] Appl. No.: 735,861

[22] Filed: Oct. 27, 1976

[51] Int. Cl.² .......................... G01F 1/08; G01F 15/02
[52] U.S. Cl. .................................. 364/510; 73/194 R; 307/265; 364/571
[58] Field of Search ........................ 235/151.34, 92 FL; 73/194 R, 229; 328/207; 307/293, 296, 265

[56] References Cited

U.S. PATENT DOCUMENTS

| 3,588,481 | 6/1971 | Stroman | 235/151.34 |
| 3,729,995 | 5/1973 | Kovacs et al. | 235/151.34 X |
| 3,854,038 | 12/1974 | McKinley | 235/151.34 |
| 3,922,526 | 11/1975 | Cochran | 235/152 |
| 3,941,989 | 3/1976 | McLaughlin et al. | 340/172.5 X |

Primary Examiner—Edward J. Wise
Attorney, Agent, or Firm—Robert E. Smith; Edward L. Bell; Harold Weinstein

[57] ABSTRACT

A conventional fluid flow meter provides a single pulse output signal for each uncorrected unit volume flow. A monostable multivibrator (MV) is triggered by said meter signal and provides a gating signal for a 1 MHZ oscillator to produce a pulse train. A temperature sensor senses the fluid flow at the meter and controls the monostable MV so that the number of pulses in said pulse train is inversely proportional to the absolute temperature of the fluid flow. A preset down counter derives from said pulse train a number representing the absolute temperature at the sensor. A burst generator generates a fixed number of pulses related to a predetermined base temperature. A divider divides said fixed number of pulses by said number representing the absolute temperature of the fluid flow and provides a single pulse output for each integer resulting from said division and stores the remainder from said division for use in the next division. A register accumulates the number of pulses resulting from said division and represents the corrected volume flow. The above calculation is completed in a small fraction of the time period between meter pulses. A solid state switch operates to supply power to said monostable MV and to enable said oscillator for a preset time period sufficient to permit said calculation to be completed. The switch then turns off the power supply and disables the oscillator until the next meter pulse occurs.

10 Claims, 2 Drawing Figures

TEMPERATURE CORRECTION SYSTEMS FOR A FLUID FLOW METER

BACKGROUND OF THE INVENTION

Systems are known in the prior art wherein temperature transducers are used to control a time base multiplier which modulates a high density meter pulse train. This is described in the Kovaks U.S. Pat. No. 3,729,995. In another prior art system, an oscillator is gated by integrating and level detecting circuits. This is shown in the Stroman U.S. Pat. No. 3,588,481. The McKinley U.S. Pat. No. 3,854,038 shows the use of high frequency transducers in combination with an oscillator which is gated by the low speed meter pulse.

In general, the prior art systems, of which the above are representative, demand a relatively large amount of power and cannot be used on battery powered service. This is a serious disadvantage, especially where remote maintenance-free installations are required.

SUMMARY OF THE INVENTION

An object of the present invention is to provide a temperature correction system for a conventional fluid flow meter, which system has a low current drain and can be powered for long periods by a battery-powered supply. This is accomplished by using integrated logic circuits of the metallic oxide semi-conductor type and by pulsing an oscillator and a precision monostable MV power supply for a period sufficient to make a calculation and then disabling the circuits until the next input pulse occurs.

The calculation is performed digitally by using conventional logic elements such as monostable MV's, gates, preset counters and dividers in a relatively simple circuit. Basically a pulse train is generated by gating the pulses from an oscillator for a variable period controlled by a monostable MV having its quasistable state controlled by a temperature sensor which senses the temperature of the fluid flow at the meter. By count down from a manually preset number, the output number is made representative of the absolute temperature of the fluid flow. A burst generator produces a pulse train having a fixed number of pulses corresponding to any selected base temperature. This pulse train is presented as input to a divide-by-N divider, where N is the number representing the absolute temperature of the fluid flow and is derived by count down as above explained. The divide-by-N divider produces a single output pulse for each integer resulting from the division and stores any remainder for use in the next division calculation. These output pulses are totallized in a register and represent the volume flow corrected to the base temperature. Of course, other system parameters could be corrected in measuring the volume flow of the fluid to a standard volume flow.

DESCRIPTION OF THE INVENTION

Figure 1:
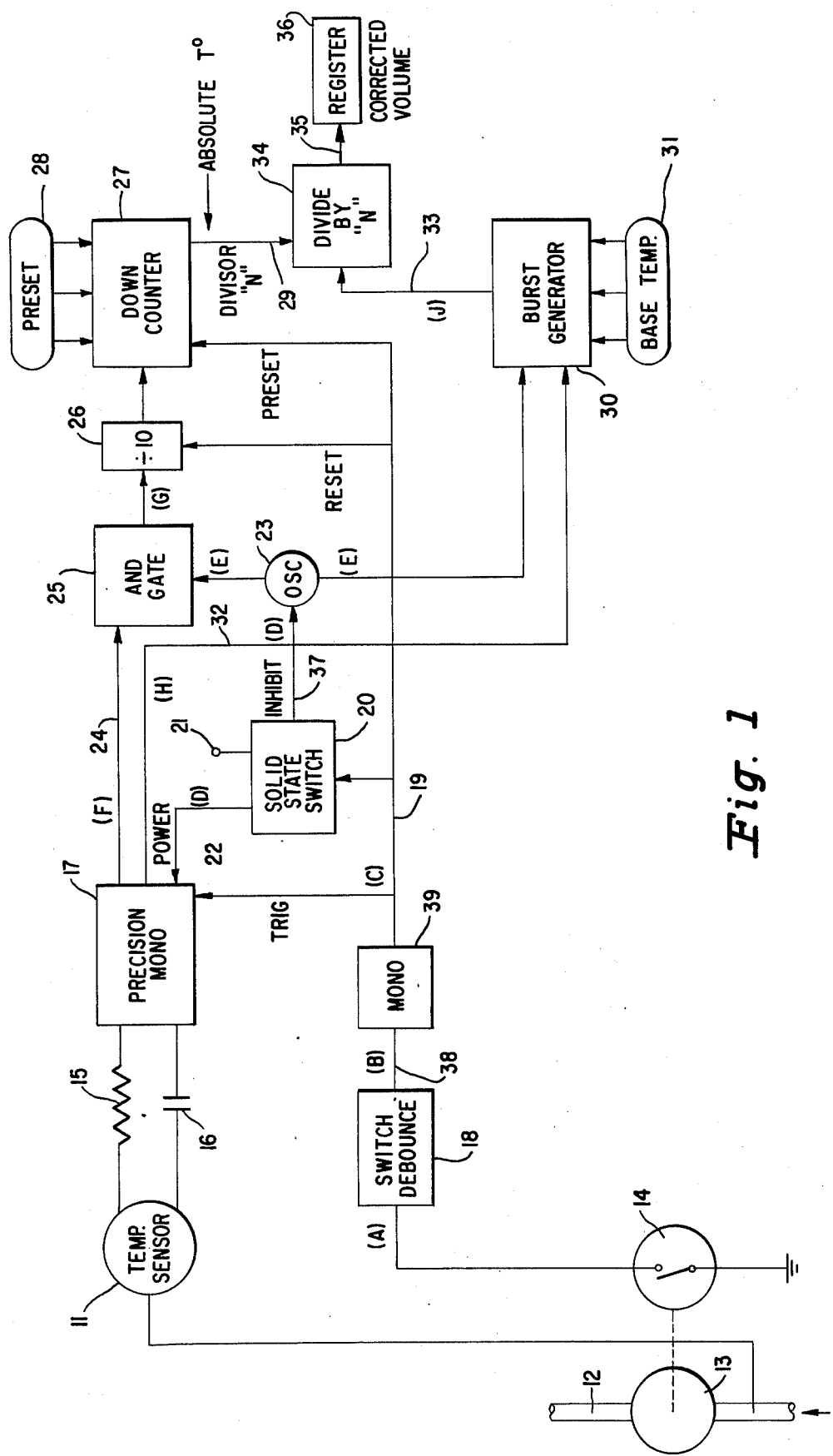
FIG. 1 of the drawing is a schematic block diagram of a system embodying a preferred form of the invention.
Figure 2:
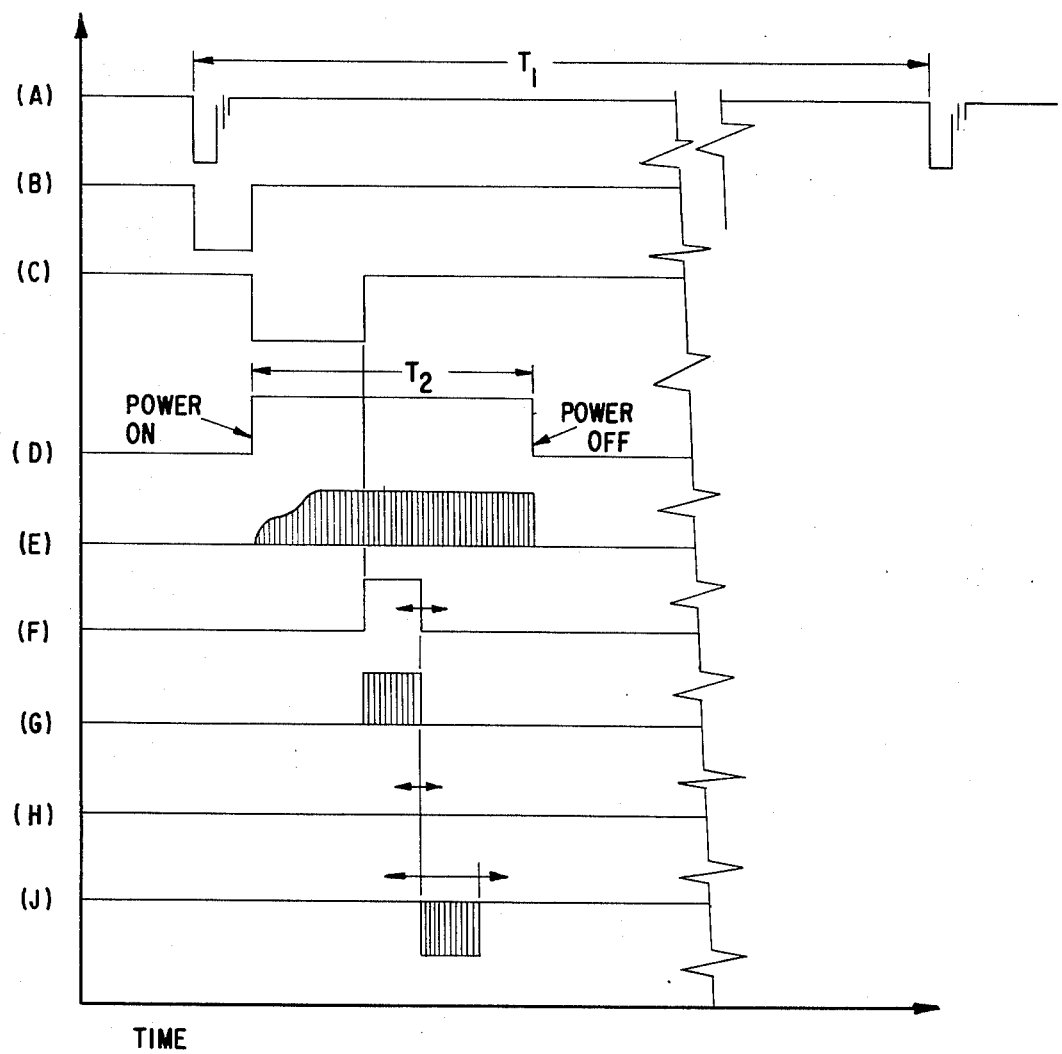
FIG. 2 is a timing diagram illustrating the pulse waveforms appearing at the indicated points in the system of FIG. 1 and is drawn to a common time base.

Referring now to FIGS. 1 and 2, 11 is a temperature sensor of the type which produces a resistance linearly proportional to 1/T where T is the sensed temperature. This sensor is placed in proximity to the fluid flow in pipe 12. A fluid flow meter produces a momentary closure of switch 14 for a given unit volume flow in pipe 12.

Resistance 15 and capacitor 16 are selected to give linear pulse width output (referred to absolute temperature) from the monostable multivibrator (MV) 17 in a manner well known for these devices.

The meter output signal from switch 14 and shown as (A) in FIG. 2 is applied to a conventional "debounce" circuit 18 and produces on line 38 a pulse output shown as (B) in FIG.2. This pulse (B) is immune from the effects of switch bounce as is well known.

A monostable MV 39 is triggered by the trailing edge of the pulse (B) on line 38 and provides a pulse on line 19 as shown as (C) in FIG. 2.

The leading edge of the pulse (C) on line 19 operates a solid state switch 20 which supplies power from power supply 21 through line 22 to the monostable MV 17 and removes an inhibit signal on line 37 to enable an oscillator 23 to build up. After a predetermined time delay, the solid state switch 20 turns off the supply of power to the monostable MV 17 and provides an inhibit signal on the inhibit line 37 to disable the oscillator 23 until the next meter pulse occurs. The solid state switch 20 is preferably a conventional switch of the type shown and described in the "1973 RCA Solid State Databook Series for COS/MOS Digital Integrated Circuits" on page 78 as a Quad Bilateral Switch for Transmission of Analog Signals. The predetermined time delay as shown in (D) of FIG. 2 is made long enough for a calculation to be completed, which in the present instance may be in the order of 200 milliseconds, and is significantly less than the time period between successive meter pulses as will be explained later.

The trailing edge of the pulse (C) on line 19 triggers the monostable MV 17 and supplies on line 24 a gating pulse (F) to an "and" gate 25. The gate 25 is held open for a time determined by the quasistable period of the monostable MV 17 which is, in turn, determined by the temperature at the sensor 11. In this manner, the number of pulses from the oscillator 23 passed by the gate 25 to a divide-by-ten divider 26 is made an inverse function of the absolute temperature sensed by sensor 11. This pulse train is shown by (G) of FIG. 2. It will be noted that the time delay of the monostable MV 39 is made long enough so that the oscillator 23 is up and running (as shown at (E) FIG. 2) before the measurement sequence begins by opening of gate 25.

The output of the divider 26 is applied as input to a down-counter 27 which is of the well-known type which may be loaded with any initial count manually determined by the preset input 28.

At the end of the gating period, the number appearing on the output line 29 may be made representative of the absolute temperature of the fluid flow at the sensor 11 by proper selection of the preset count at 28. A numerical example will later show how this may be accomplished.

The number appearing on line 29 is calculated by count down from the preset number at 28 for each and every closure of the meter switch 14 and is thus continuously updated for temperature changes in the fluid flow.

A burst generator 30 is preset by base temperature information on preset lines 31 and, for a given base temperature, generates a fixed number of pulses. The generator 30 is triggered on by a pulse (H) from the monostable MV 17 on line 32 which occurs responsively to closure of gate 25 so that the number on line 29 is completed before the generator 30 begins to supply the fixed number of pulses (J) on line 33.

The fixed number of pulses (J) from generator 30 is presented on line 33 as input to a divider 34. The capacity of the divider 34 is determined by the number appearing on line 29. When the number of pulses on line 33 equals the number on line 29, the divider 34 overflows and produces a single pulse output on line 35. Any further pulses on line 33 will remain in the divider 34 for use in the next division calculation.

The pulses on line 35 are totalized in a register 36 and represent the volume flow in pipe 12 corrected to the base temperature preset on lines 31.

It will be noted that the number appearing on line 29 varies with the sensed temperatue. This number is the divisor "N" for the divider 34 and is calculated for each pulse (C) appearing on line 19. Thus the down counter 7 is preset by the leading edge of the pulse (C) and the counter is cleared for entry of a new count. Also the divide-by-ten divider 26 is reset by the leading edge of the pulse (C) on line 19 and is cleared for entry of a new count.

A numerical example will now be given to illustrate more clearly the operation of the system of this invention With the oscillator 23 producing a signal of 1 MHZ pulse rate (E) and with a temperature of 60° F at the sensor 11, the gate width (F) obtained will result in 5200 pulses (G) to the divide-by-ten divider 26 and 520 pulses input to the down counter 27. A preset of 1040 at preset 28 will result in a divisor on line 29 of 1040−520=520, which is the absolute temperature at sensor 11. Similarly, for 120° F at the sensor 11, the gate 25 produces 4600 pulses and a divisor of 1040−520 =520 on line 29.

Assume that the base temperature is 60° F. Then the burst generator 30 is preset by information on lines 31 to produce 460+60=520 pulses (J) on line 33. With a sensor temperature of 120° F, the output to the register 36 is 520/580 pulses. Since this is less than one pulse, no change will occur in the totalized output. However, at the next meter output signal (A), the divider 34 will overflow resulting in one output pulse to the register 36 and 1040−580=460 pulses remaining in the divider 34. The temperature is calculated for each volumetric pulse. Remainders are not thrown away but are stored in the divider 34. It is clear from this example the resulting divided pulse output to the register 36 may occur anytime during the burst of pulses shown as (J) in FIG. 2 or may not occur at all.

Any base temperature may be selected so that $Vc \times Vu$ x T-Base/T-Flowing, where:

Vc=corrected volume
Vu=uncorrected volume
T-Base=base temperature
T-Flowing =temperature of flowing fluids.

In the example above, it will be noted that, for 10 meter pulses, 9 pulses are accumulated in the register 36. This means that the calculation $Vc = (9/10) Vu$ is correct to the value $(520/580) Vu$ to within ± 0.5%.

Referring to FIG. 2, it will be seen that $T_1$ is the period between successive meter pulses (A) and $T_2$ is the period during which the oscillator 23 is on and power is applied to the monostable MV 17. While $T_1$ may vary considerably depending on the volume flow rate, $T_2$ can always be made significantly smaller than $T_1$ because the digital calculation requires such a small time period.

Typically $T_2 = T_1/100$. Since the oscillator 23 and the monostable MV 17 are the large energy consuming elements of the system and since their duty cycle is minimized as shown above, the system of this invention can be used on battery power with acceptable battery life. This is a considerable advantage over any prior art continuously operated correction system.

While the invention has been described by means of a specific embodiment, it is not intended to be limited thereto, and obvious modifications will occur to those skilled in the art without departing from the spirit and scope of the invention defined in the accompanying claims:

I claim:

1. In a system for correcting the measurement of the volume flow of a fluid to a standard volume flow in response to a variable physical condition of said fluid, the combination comprising:

means providing a single pulse signal for each uncorrected unit volume flow, power demanding means initiated by said pulse signal and responsive to said variable condition for calculating the volume flow corrected to a standard volume flow, and means for substantially reducing the power demand of said system by controlling the duty cycle of the supply of power to at least part of said calculating means.

2. A correction system for a fluid flow meter of the type providing a single pulse output signal for each uncorrected unit volume flow, comprising:

means including power consuming means initiated by each of said meter pulses for calculating the volume flow corrected to a base value of a variable physical condition of said fluid, means for completing said calculation in a time period substantially less than the time period between successive meter pulses, and means for terminating the supply of power to at least one of said power consuming means after a time period sufficient to complete said calculation but substantially less than the time period between successive meter pulses.

3. A system according to claim 2, including a monostable MV and switch means operative responsively to said meter pulses to apply power to said monostable MV for a predetermined time period substantially less than the time period between successive meter pulses.

4. A system according to claim 2, including an oscillator and switch means operative responsively to said meter pulses to turn on said oscillator and to inhibit further operation of said oscillator after a predetermined time period substantially less than the time period between successive meter pulses.

5. A temperature correction system for a fluid flow meter of the type providing a single pulse output signal for each uncorrected unit volume flow, comprising:

means responsive to each said pulse output, and including a temperature sensor, for providing a train of pulses having a number inversely proportional to the absolute temperature of the fluid flow, means including a preset down counter for deriving from said train of pulses a number representing the absolute temperature of the fluid flow, means for generating a fixed number of pulses related to a predetermined base temperature, means for dividing said fixed number of pulses by said number representing said absolute temperature of the fluid flow, means providing a single output pulse for each integer resulting from said division and for storing the remainder from said division for use in the next division, and means for registering the accumulated number of pulses resulting from said division.

6. A system according to claim 5, in which a monostable MV provides a variable gating signal for a time period controlled by said temperature sensor.

7. A system according to claim 6, in which an oscillator is gated by said monostable MV and provides a pulse train having a number of pulses inversely related to the temperature sensed by said sensor.

8. A system according to claim 7 including a solid state switch for turning on said oscillator responsively to each meter pulse and for applying an inhibit signal to disable said oscillator after a predetermined time period substantially less than the time period between successive meter pulses.

9. A system according to claim 7, in which solid state switch means operates responsively to the meter pulse to apply power to said monostable MV and to enable said oscillator for a predetermined time period substantially less than the time period between successive meter pulses.

10. A system according to claim 6 including a power supply for said monostable MV and a solid state switch for turning on said power supply responsively to said meter pulse and for turning off said power supply after a predetermined time period substantially less than the time period between successive meter pulses.

* * * * *

UNITED STATES PATENT OFFICE
CERTIFICATE OF CORRECTION

Patent No. 4,056,717                        Dated   November 1, 1977

Inventor(s)  Malcolm W. Cornforth

It is certified that error appears in the above-identified patent and that said Letters Patent are hereby corrected as shown below:

Column 3, line 20, "7" should read -- 27 --

Column 3, line 36, "1040-520=520," should read -- 1040-460=580, --

Column 3, line 52, "Vc x Vu" should read -- Vc=Vu --

Signed and Sealed this

Thirtieth Day of May 1978

[SEAL]

Attest:

RUTH C. MASON
Attesting Officer

LUTRELLE F. PARKER
Acting Commissioner of Patents and Trademarks